United States Patent Office.

WILLIAM S. KIMBALL, OF ROCHESTER, NEW YORK, ASSIGNOR TO WILLIAM S. KIMBALL & CO., OF SAME PLACE.

PROCESS OF MANUFACTURING SMOKING-TOBACCO.

SPECIFICATION forming part of Letters Patent No. 239,661, dated April 5, 1881.

Application filed August 12, 1880. (No model.)

*To all whom it may concern:*

Be it known that I, WILLIAM S. KIMBALL, of the city of Rochester, in the county of Monroe and State of New York, have invented an Improved Process of Manufacturing Smoking Tobacco, of which the following is a specification.

In most of the processes now practiced for preparing tobacco for consumption there is produced a certain proportion of waste material, consisting of tobacco in a condition so finely divided as to be incapable of use in any known manner. Thus in preparing granulated smoking-tobacco a part of the raw material is pulverized so finely as to be unfit for this purpose. This comminuted material, moreover, consists, principally, of the best portions of the leaf, entirely free from stems. It is generally separated from the merchantable article by sieving, and its proportion usually rises to ten per cent. It is sometimes known as "shorts," and is regarded by most manufacturers as worthless, or nearly so, and sold at a nominal price. In the manufacture of cigars, cigarettes, and fine-cut, and, in fact, in all processes where tobacco is handled, there is produced, in greater or less quantity, this finely-divided shorts, which is nearly useless for all practical purposes.

My invention has for its object the utilization of this finely-divided material or shorts by employing it in the manufacture of smoking-tobacco; and my invention consists in treating leaf or scrap tobacco, in any of its usual forms, with a solution of adhesive material, in adding thereto a certain percentage of finely-divided tobacco or shorts, and in subsequently passing the mixture through a cutting-machine, by which the ingredients are compacted and caused to adhere together, and cut into a merchantable article of smoking-tobacco.

In the practical working of my improved process I take a quantity of leaf or scrap tobacco, and, having spread it out on the floor or other plane surface, sprinkle it with or otherwise apply to it a sufficient quantity of a solution of gum or other suitable adhesive material to cause the leaves or scraps, when firmly pressed together, to adhere to each other. Care is taken during this operation that the gum solution comes in contact with the entire surface of the leaves, which result may be accomplished by stirring or in any preferred manner. The proportion of gum may vary from five to ten per cent. of the weight of the tobacco operated on. After being treated with gum the tobacco should be left undisturbed for a sufficient length of time to allow the gum solution to soak uniformly through the mass. At the same time with the application of the gum, or subsequently, a quantity of finely-divided tobacco or shorts is added to the leaf-tobacco and thoroughly mixed therewith by stirring. Any suitable mechanical device may be employed for this purpose. The fine particles of tobacco adhere to the leaves or scraps and become attached thereto, so that after the cutting operation they cannot be distinguished or discovered in the finished product by any ordinary examination. The proportion of shorts may vary from twenty-five to fifty per cent. of the whole amount of tobacco. The proportion of gum employed will vary with the quantity of shorts, the larger proportion of the latter requiring a greater amount of the adhesive material. The tobacco, after being treated with the gum and mixed with shorts, is subjected to the action of any ordinary cutting-machine, by which it is reduced to a condition suitable for smoking. It is preferable to run the machine somewhat slower than is now customary in manufacturing fine-cut. The mixture of leaves or scraps and shorts, in passing through the machine, is divided by the knives in parallel planes, approximately at right angles with the length of the leaves, and the slices cut from each leaf, adhering together by their opposed sides, inclose the finely-divided tobacco or shorts between them, so that the latter are entirely undistinguishable, and the finished article presents the well-known "flaky" appearance.

In the manufacture of the cheaper grades of smoking-tobacco a portion of finely-cut stems may be added with the shorts.

The advantages of my improved process will be readily perceived from the fact that I am enabled to produce a superior quality of smoking-tobacco from what are ordinarily considered waste or refuse materials. The addition of the waste or shorts, which are usually of high grade, raises the quality of the mixture so as to produce a superior article, while the incorporation of the shorts with the mass is accomplished by the treatment with the adhesive material.

I do not claim herein the process of manufacturing tobacco patented to me June 30, 1874.

I claim—

The herein-described process of utilizing finely-divided tobacco or shorts in the manufacture of smoking-tobacco, consisting in mixing the same in suitable proportion with leaf or scrap tobacco prepared with gum or other suitable adhesive material, and in subsequently subjecting the mixture to the operation of cutting, substantially as and for the purposes set forth.

WILLIAM S. KIMBALL.

Witnesses:
GEO. B. SELDEN,
JAMES C. HART.